US012689996B2

(12) United States Patent
Moon

(10) Patent No.: US 12,689,996 B2
(45) Date of Patent: Jul. 21, 2026

(54) METHOD AND APPARATUS FOR PROVIDING TIME SYNCHRONIZATION BETWEEN WIRELESS USER EQUIPMENT

(71) Applicant: Samsung Electronics Co., Ltd., Suwon-si (KR)

(72) Inventor: Sangjun Moon, Suwon-si (KR)

(73) Assignee: Samsung Electronics Co., Ltd.

( * ) Notice: Subject to any disclaimer, the term of this patent is extended or adjusted under 35 U.S.C. 154(b) by 602 days.

(21) Appl. No.: 17/953,694

(22) Filed: Sep. 27, 2022

(65) Prior Publication Data

US 2023/0103717 A1     Apr. 6, 2023

(30) Foreign Application Priority Data

Oct. 6, 2021   (KR) ......................... 10-2021-0132713

(51) Int. Cl.
H04W 56/00         (2009.01)
(52) U.S. Cl.
CPC ................................. H04W 56/001 (2013.01)
(58) Field of Classification Search
CPC .................................................. H04W 56/001
USPC ........................................................ 370/350
See application file for complete search history.

(56) References Cited

U.S. PATENT DOCUMENTS

| | | | |
|---|---|---|---|
| 6,494,435 B1 | 12/2002 | Cauchon | |
| 2016/0302209 A1 | 10/2016 | Behravan et al. | |
| 2017/0237838 A1 | 8/2017 | Vandevoorde et al. | |

| | | | | |
|---|---|---|---|---|
| 2020/0404605 A1 * | 12/2020 | Centonza | .......... | H04W 56/0015 |
| 2021/0153145 A1 * | 5/2021 | Abedini | .............. | H04W 72/542 |
| 2023/0180157 A1 * | 6/2023 | Chandramouli | .... | H04W 56/001 370/350 |
| 2024/0292348 A1 * | 8/2024 | Luetzenkirchen | .. | H04L 43/0817 |

OTHER PUBLICATIONS

Nokia et al., KI#3B, Sol#7: Updates for Exposure of Time Synchronization, S2-2007908, Oct 12-Oct. 23, 2020.
Nokia et al., Control of the 5G reference time distribution, S2-2105567, Aug 16-Aug. 27, 2021.
Nokia et al., Time synchronization accuracy—procedure, S2-2104123, May 17-May 28, 2021.
International Search Report dated Jan. 6, 2023, issued in International Patent Application No. PCT/KR2022/014630.
Extended European Search Report dated Dec. 4, 2024, issued in European Application No. 22878812.1-1206.
Nokia, Nokia Shanghai Bell; Impact of handover on time synchronization, 3GPP TSG-RAN WG3 Meeting #113-e, R3-213449, Aug. 6, 2021.
Nokia, Nokia Shangai Bell, Samsung, Deutsche Telekom, Huawei, HiSilicon, ETRI; Exposure of Time synchronization as a service—description, 3GPP TSG-SA2 Meeting #146E, S2-2105566, Aug. 10, 2021.

* cited by examiner

*Primary Examiner* — Asad M Nawaz
*Assistant Examiner* — Hugh Mark Ashley
(74) *Attorney, Agent, or Firm* — Jefferson IP Law, LLP

(57)          ABSTRACT

A method performed by an entity in a wireless communication system is provided. The method includes identifying whether a synchronization service is required in a registered terminal, obtaining information regarding at least one of synchronization accuracy, time error budget, or holdover time based on a requirement of the terminal and a current synchronization accuracy of the synchronization service, and transmitting, to the terminal, a message including an indication that the synchronization service is available based on the obtained information.

20 Claims, 12 Drawing Sheets

Timing Source 1

Timing Source 1 resilient time sync

5G System land-based and fiber-based timing services

Timing Source 2

METHOD AND APPARATUS FOR PROVIDING TIME SYNCHRONIZATION BETWEEN WIRELESS USER EQUIPMENT

CROSS-REFERENCE TO RELATED APPLICATION(S)

This application is based on and claims priority under 35 U.S.C. § 119(a) of a Korean patent application number 10-2021-0132713, filed on Oct. 6, 2021, in the Korean Intellectual Property Office, the disclosure of which is incorporated by reference herein in its entirety.

BACKGROUND

1. Field

The disclosure relates to a wireless communication network. More particularly, the disclosure relates to a method of providing time synchronization between wireless user equipment for a $3^{rd}$ generation partnership project (3GPP) 5th generation system (5GS).

2. Description of Related Art

To meet the ever-increasing demand with respect to wireless data traffic since the commercialization of the 4th generation (4G) communication system, there have been efforts to develop an advanced fifth generation (5G) system or pre-5G communication system. For this reason, the 5G or pre-5G communication system is also called a beyond 4th-generation (4G) network communication system or post long-term evolution (LTE) system.

Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system.

In addition, in the 5G system, an advanced coding modulation (ACM), e.g., hybrid frequency shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of everything (IoE) technologies, in which a big data processing technology through connection with a cloud server, for example, are combined with an IoT technology, have also emerged. To implement IoT, various technologies, such as a detection technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, or the like, are implemented by the 5G communication technologies, such as beamforming, MIMO, and array antenna schemes, or the like. Even application of a cloud radio access network (cloud RAN) as the aforementioned big data processing technology may be an example of convergence of 5G and IoT technologies.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of supporting timing resiliency to provide reliable time synchronization between user equipment (UEs) by using a $5^{th}$ generation system (5GS)-based time synchronization method between wireless UEs as a substitute when a time synchronization method between wireless UEs based on other schemes, such as a global navigation satellite system (GNSS) is not available for a certain period of time.

Additional aspects will be set forth in part in the description which follows and, in part, will be apparent from the description, or may be learned by practice of the presented embodiments.

In accordance with an aspect of the disclosure, a method performed by an entity in a wireless communication system is provided. The method includes identifying whether a synchronization service is required in a registered terminal, obtaining information regarding at least one of synchronization accuracy, time error budget, or holdover time based on a requirement of the terminal and a current synchronization accuracy of the synchronization service, and transmitting, to the terminal, a message including an indication that the synchronization service is available based on the obtained information.

The requirement of the terminal may include synchronization accuracy required by the terminal or holdover time required by the terminal.

The identifying whether the synchronization service is required may include identifying whether an existing synchronization service is available based on at least one of information of the existing synchronization service received from a distributed base station or an external application function (AF), or a signal received from the terminal.

The identifying whether the synchronization service is required may include receiving, from an access and mobility management (AMF) entity, information about the terminal requiring provision of the synchronization service based on location information of the terminal.

The information about the terminal may include the requirement of the terminal.

The message may be transmitted via at least one of access and mobility management non-access stratum (AM NAS), session management non-access stratum (SM NAS), or access stratum (AS).

The method may further include identifying whether the synchronization service is required based on information obtained from an AF.

The method may further include requesting, to another entity, a changed requirement of the terminal, and receiving, from the other entity, the changed requirement of the terminal.

The method may further include receiving modified information including information regarding at least one of the synchronization accuracy, the time error budget, or the holdover time, and determining a period of a system information block (SIB) or a delay time measurement period for measuring a timing advance value with the terminal.

The method may further include comparing the requirement of the terminal with the current synchronization accuracy of the synchronization service, and determining, based on a result of the comparing, whether the synchronization service is available or the synchronization accuracy.

In accordance with another aspect of the disclosure, an entity for performing communication in a wireless communication system is provided. The entity includes a transceiver, and at least one processor coupled with the transceiver and configured to identify whether a synchronization service is required in a registered terminal, obtain information regarding at least one of synchronization accuracy, time error budget, or holdover time based on a requirement of the terminal and a current synchronization accuracy for the synchronization service, and transmit, to the terminal, a message including an indication that the synchronization service is available based on the obtained information.

The requirement of the terminal may include synchronization accuracy required by the terminal or holdover time required by the terminal.

The at least one processor may be further configured to identify whether an existing synchronization service is available based on at least one of information of the existing synchronization service received from a distributed base station or an external application function (AF), or a signal received from the terminal.

The at least one processor may be further configured to receive, from an access and mobility management (AMF) entity, information about the terminal requiring provision of the synchronization service based on location information of the terminal.

The information about the terminal may include the requirement of the terminal.

The message may be transmitted via at least one of access and mobility management non-access stratum (AM NAS), session management non-access stratum (SM NAS), or access stratum (AS).

The at least one processor may be further configured to identify whether the synchronization service is required based on information obtained from an AF.

The at least one processor may be further configured to request, to another entity, a changed requirement of the terminal, and receive, from the other entity, the changed requirement of the terminal.

The at least one processor may be further configured to receive modified information including information regarding at least one of the synchronization accuracy, the time error budget, or the holdover time, and determine a period of a system information block (SIB) or a delay time measurement period for measuring a timing advance value with the terminal.

The at least one processor may be further configured to compare the requirement of the terminal with the current synchronization accuracy of the synchronization service, and determine, based on a result of the comparing, whether the synchronization service is available or the synchronization accuracy.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
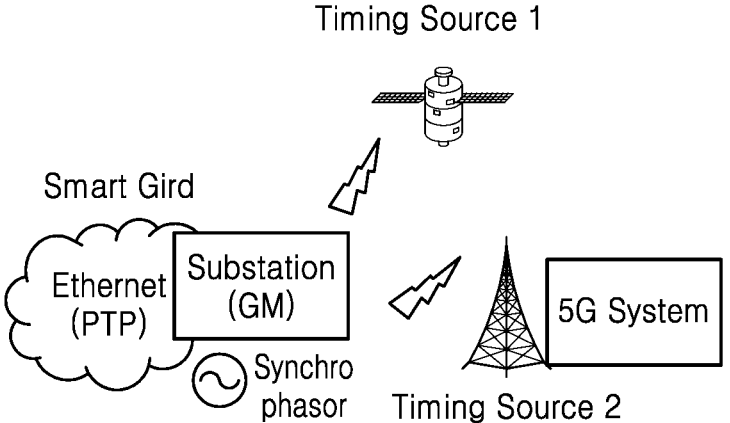
FIGS. 1A and 1B illustrate a time resiliency system in which a 5th generation system (5GS) provides time synchronization for a user equipment (UE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

Herein, the terms to identify access nodes, the terms to refer to network entities, the terms to refer to messages, the terms to refer to interfaces among network entities, the terms to refer to various types of identification information, or the like, are examples for convenience of explanation. Accordingly, the disclosure is not limited to the terms as herein used, and may use different terms to refer to the items having the same meaning in a technological sense.

In the following description, for convenience of explanation, terms and definitions used in the most recent standards among the existing communication standards, i.e., in the 5th generation system (5GS) and a new radio (NR) standard defined in the 3<sup>rd</sup> generation partnership project (3GPP) will be used. The disclosure is not, however, limited to these terms and definitions, and may equally apply to any radio communication networks that conform to other standards. Especially, the disclosure may be applied to the 3GPP 5GS/NR (which is the 5G mobile communication standard).

When a wireless communication network is used for an application, such as a smart grid, accurate time synchronization is required between user equipment (UEs). In this case, time synchronization (sync) between UEs may be implemented by e.g., a global navigation satellite system (GNSS) that uses satellite signals. However, when the GNSS is not available for a moment, there may be a failure of accurate time sync between UEs, causing problems in wireless communication.

Furthermore, when a network-side time sensitive networking (TSN) translator (NW-TT) or a device-side TSN translator (DS-TT) creates and transmits a (generalized) precise time protocol ((g)PTP) message to an external wired or wireless node, there is a need to determine whether a 3GPP network (e.g., 5GS) is a sync source to convey the (g)PTP message even within the 3GPP network (e.g., 5GS).

FIG. 1A illustrates a time resiliency system in which a 5GS provides time synchronization for a UE according to an embodiment of the disclosure.

Referring to FIG. 1A, a 5GS may provide sync for a UE via an air signal. Time sync between UEs is a requisite for e.g., a smart grid, but when time sync is performed through a GNSS, the time sync between UEs may not be performed due to many reasons. In an embodiment of the disclosure, even in this case, a time sync using 5GS may be used to maintain time sync between UEs.

Accuracy in time sync required by the UE is satisfied enough with time sync accuracy provided by the GNSS, but when the sync method is changed based on sync signals provided in the 5GS time sync method, the required accuracy may be met within a certain period of time. In this case, the period of time for which the time sync accuracy required by the UE is met after the time sync method is changed based on sync signals provided in the 5GS time sync method is referred to as a holdover time.

Even after the sync method is changed into the 5GS time sync method, there may be a different requirement for the holdover time for each application of the UE. Hence, a time resiliency system needs to satisfy a requirement for the holdover time required by the UE.

Figure 1B:
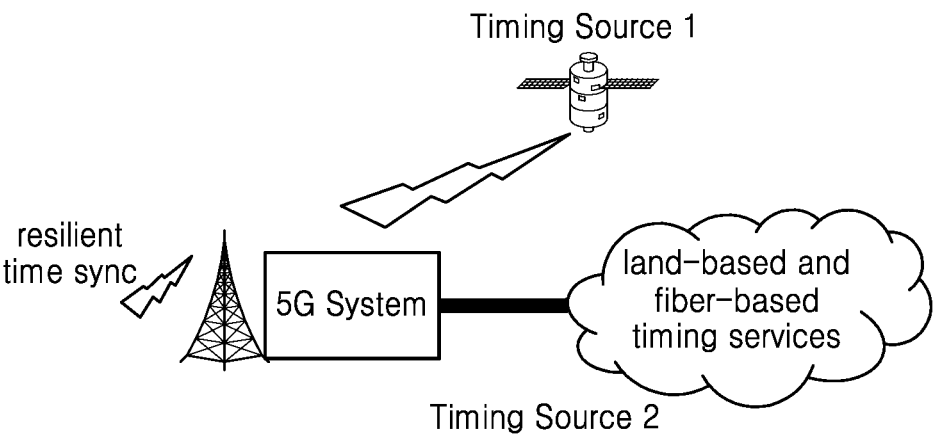

FIG. 1B illustrates a time resiliency system in which a 5GS provides time synchronization for a UE according to an embodiment of the disclosure.

Referring to FIG. 1B, a 5GS needs to be able to provide time sync information for the UE when the GNSS is not available. Hence, the 5GS needs to have another clock source, such as time sync information through a wired network in addition to the GNSS.

Figure 2:
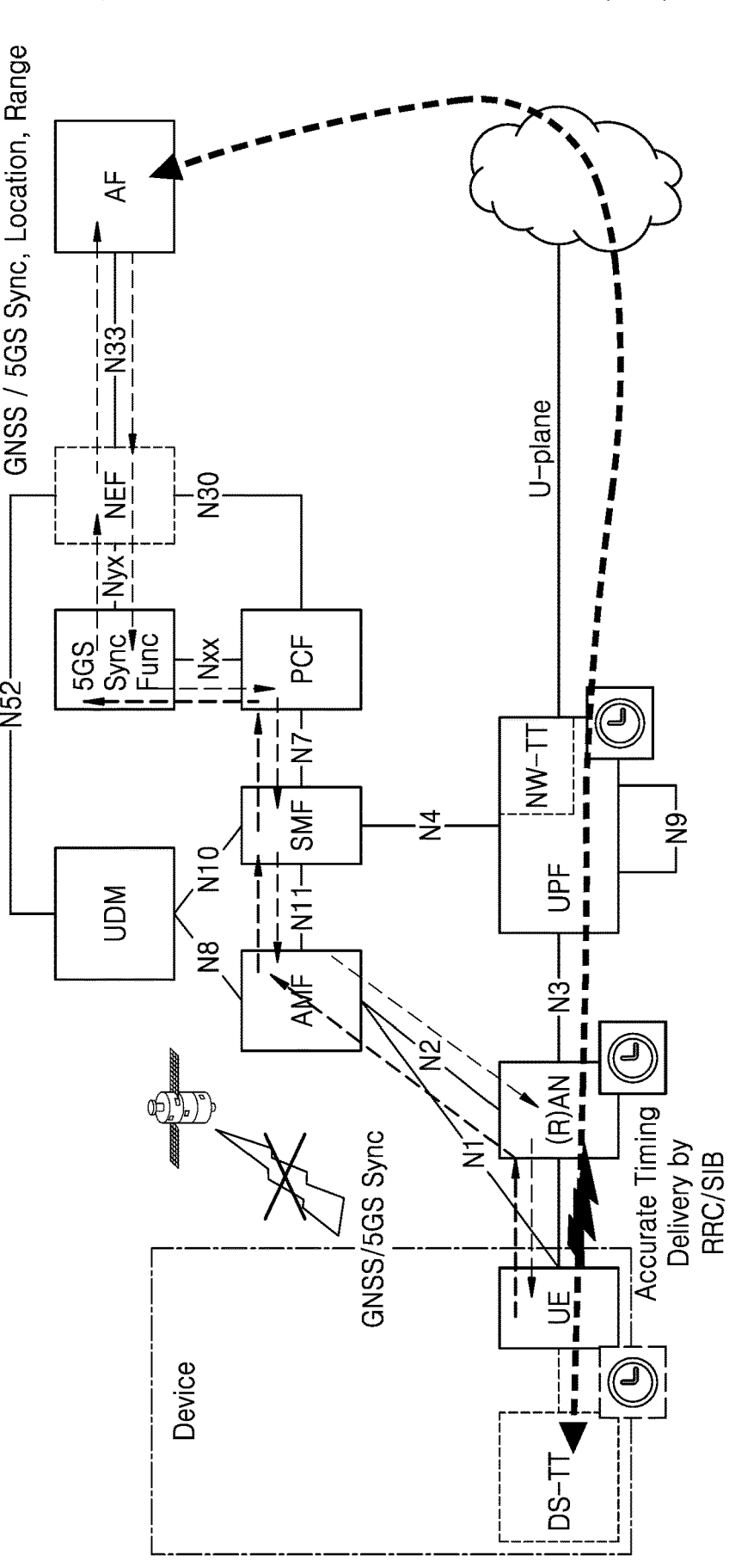
FIG. 2 illustrates how a 5GS provides time synchronization for a UE according to an embodiment of the disclosure.

FIG. 2 illustrates how a 5GS provides time sync for a UE according to an embodiment of the disclosure.

Referring to FIG. 2, it illustrates a method by which a 5<sup>th</sup> generation core (5GC) sends the UE an indication that 5GS sync is available when a time resiliency system is provided using a 5GS.

The 5GC may determine whether to use the GNSS or the 5GS sync. In an embodiment of the disclosure, the 5GC may determine whether the GNSS is available in a certain region, based on information collected from base stations (BSs) distributed in different regions. In an embodiment of the disclosure, the UE may notify a 5GC or an application function (AF) of whether the GNSS is available or the 5GS sync is available. In the case that the UE sends the notification to the AF, the AF may in turn notify this information to the 5GC.

The 5GC may indicate to the UE that the 5GS may provide sync that may replace the GNSS. In an embodiment of the disclosure, the 5GC may use session management (SM) non access stratum (NAS) to indicate to the UE that the 5GS is able to provide sync that may replace the GNSS. In an embodiment of the disclosure, then 5GC may use access management (AM) NAS to indicate to the UE that the 5GS is able to provide sync that may replace the GNSS. In an embodiment of the disclosure, the 5GC may use access stratum (AS) to indicate to the UE that the 5GS is able to provide sync that may replace the GNSS. In an embodiment of the disclosure, when an AF is involved, the AF may directly indicate to the UE that the 5GS is able to provide sync that may replace the GNSS.

The UE may inform the 5GC of requirements for time sync accuracy and a holdover time. In an embodiment of the disclosure, the 5GC may make an extra network function (NF) take care of the UE requirements. In an embodiment of the disclosure, the 5GC may forward the UE requirements to the AF.

The 5GC may compare a level of sync accuracy provided by the current 5GS with sync accuracy and holdover time requirements provided by the UE. The 5GC may determine ON or OFF of a sync provision method of the 5GS or regulate (increase or decrease) the level of sync accuracy based on a result of the comparing. In an embodiment of the disclosure, the 5GC may determine ON or Off of a sync provision method of the 5GS or regulate (increase or decrease) the level of sync accuracy based on the result of the comparing and information about whether the GNSS is available.

In an embodiment of the disclosure, the level of sync accuracy provided by the 5GS may be represented in a time sync error budget form. For example, a large time sync error budget means low sync accuracy, and a small time sync error budget means high sync accuracy.

Figure 3:
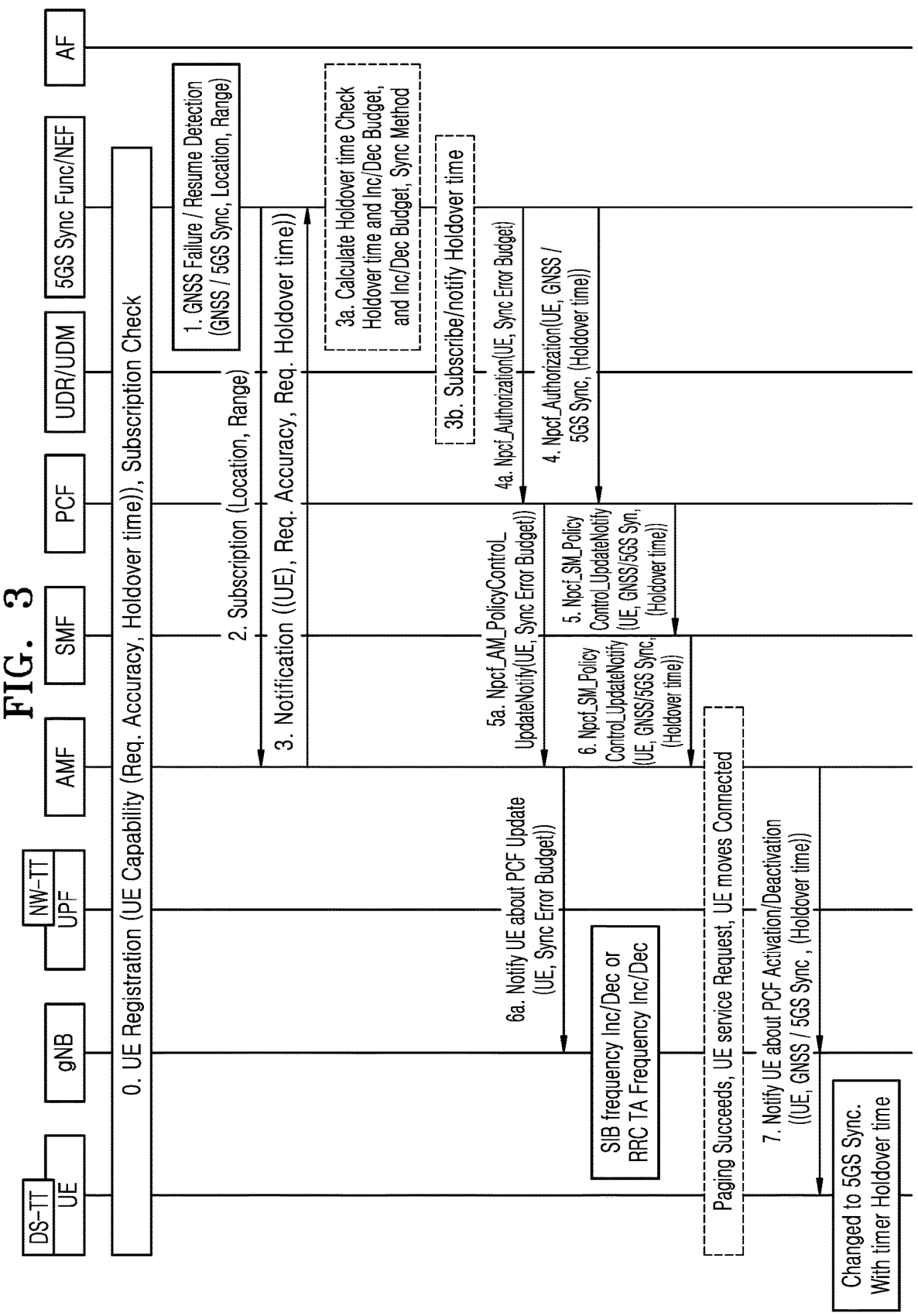
FIG. 3 illustrates an occasion when a 5th generation core (5GC) conveys a synchronization indication to a UE via session management (SM) non access stratum (NAS) (SM NAS) according to an embodiment of the disclosure.

FIG. 3 illustrates an occasion when a 5GC conveys a synchronization indication to a UE via SM NAS according to an embodiment of the disclosure.

Referring to FIG. 3, in operation 0, the UE may send requirements for time sync accuracy and holdover time to the 5GC through a process of registering for the 5GS. On receiving the requirements, the 5GC may determine subscription information including e.g., whether the UE is able to receive 5GS sync. When the subscription information is identified, the 5GC may additionally store the content in e.g., a unified data management (UDM).

In operation 1, the 5GC may determine whether the GNSS is available. The 5GC may identify information about a position (e.g., position coordinates and a range) where a change in whether the GNSS is available occurs. As it is the case that the identification is made by the 5GC, the position information may be represented based on a cell identity (ID) or the like. Whether the GNSS is available may be determined through an extra 5GS sync NF in the 5GC.

In operation 2, the 5GS sync NF may send an access and mobility management function (AMF) a request (i.e., subscription) to notify a matching UE based on the position information when the matching UE is found.

In operation 3, the AMF may notify the 5GS sync NF of matching UEs based on the position information. In this case, the notification sent from the AMF may include time sync accuracy and holdover time requested by the UE.

In operation 3a, the 5GS sync NF may compute a sync accuracy level or a time error budget that may satisfy the UE requirements based on the time sync accuracy and holdover time requested by the UE and time sync accuracy provided by the current 5GS. When the 5GS sync NF manages multiple UEs, the 5GS sync NF may determine the sync accuracy level or the time error budget provided by the 5GS based on a maximum holdover time requirement.

In operation 3b, the 5GS sync NF may send a UDM/ unified data repository (UDR) a request (i.e., subscription) to notify a change in holdover time information of the UE when the change occurs.

In operations 4a, 5a and 6a, when there is a change in sync accuracy level or time error budget provided by the 5GS, the 5GS sync NF may convey the sync accuracy level or time error budget provided by the 5GS to a radio access network (RAN) node through a UDR, a policy control function (PCF) and an AMF. In this case, the RAN node may regulate a system information block (SIB) period (e.g., increase or decrease) based on the sync error budget information sent from the 5GC (or 5GS sync NF). Furthermore, the RAN node may fulfill the holdover time requirement of each UE by regulating a measurement period of a delay time between the BS and the UE used to measure a timing advance value with the UE.

In operations 4, 5, 6 and 7, the 5GS sync NF may send the matching UE based on the position information a message including an indication that the GNSS or the 5GS sync is available. The message may include information about the holdover time. In this case, the holdover time may be managed with a timer through intermediate PCF, SMF, AMF and gNB. For example, when the 5GS sync is used in place of the GNSS for more than holdover time, the intermediate PCF, SMF, AMF and gNB may automatically handle the indication as invalid. In an embodiment of the disclosure, this procedure may be proceeded simultaneously with the 5GS being a sync source to convey a port management information container for utilizing a sync message of e.g., IEEE 802.1AS and IEEE 1588.

When the holdover time information is sent to the UE, the UE may determine whether the holdover time meets a requirement of the UE. When the holdover time is met (greater than the requirement of the UE), the UE may determine that the sync accuracy level provided by the 5GS is higher than the sync accuracy provided by the UE. The UE may set a timer based on the received holdover time information. For example, a maximum time for which the 5GS sync is used in place of the GNSS may be set to the received holdover time.

After operation 6, when the UE has been in an idle mode, a paging process of the UE is performed and upon identifying the paging process, the UE sends a service request to the RAN node and switches into a connected mode, and then operation 7 may be performed.

Figure 4:
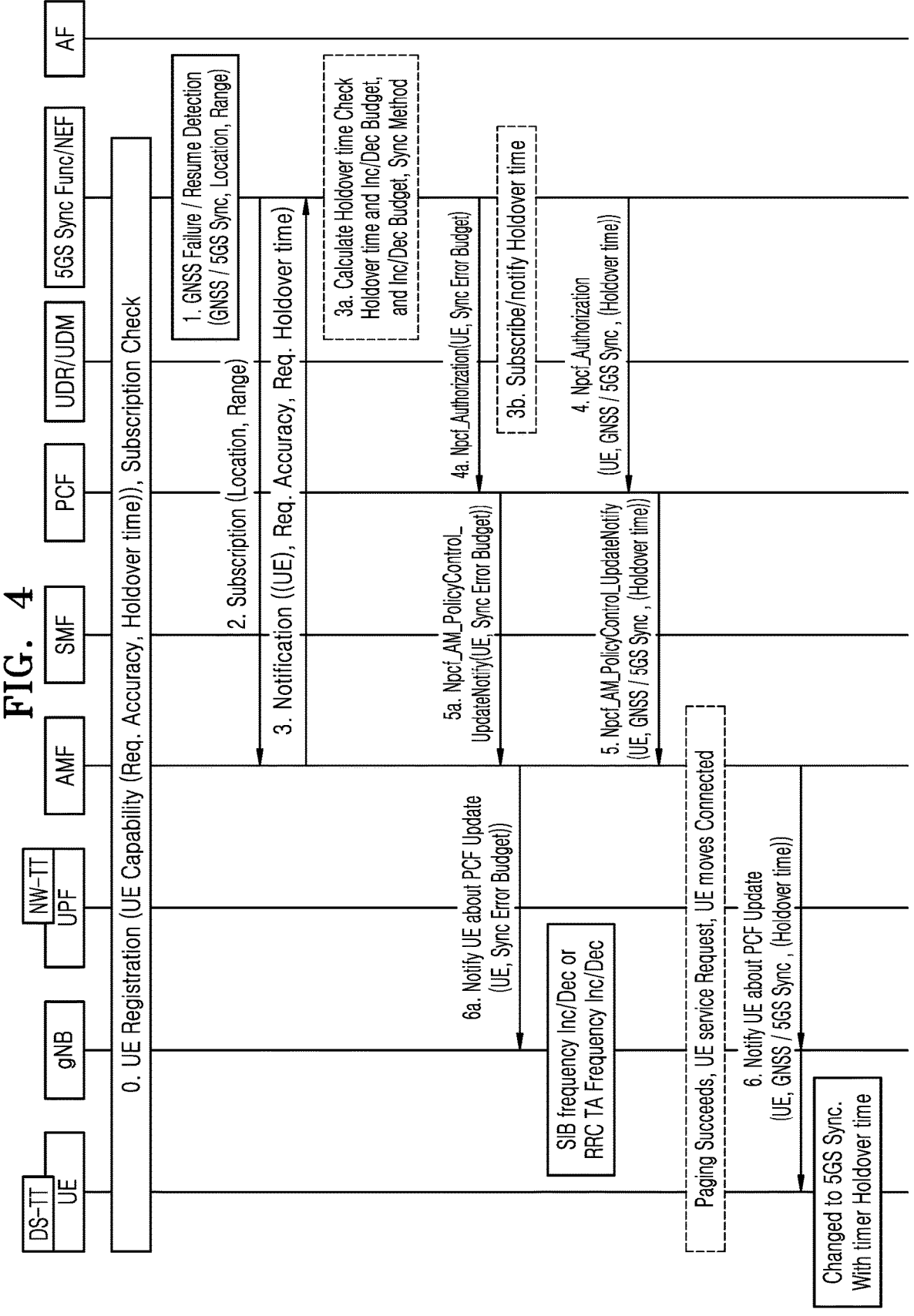
FIG. 4 illustrates an occasion when a 5GC conveys a synchronization indication to the UE via access management (AM) NAS according to an embodiment of the disclosure.

FIG. 4 illustrates an occasion when a 5GC conveys a synchronization indication to the UE via access management (AM) NAS according to an embodiment of the disclosure.

Referring to FIG. 4, in operation 0, the UE may send requirements for time sync accuracy and holdover time to the 5GC through a process of registering for the 5GS. On receiving the requirements, the 5GC may determine subscription information including e.g., whether the UE is able to receive 5GS sync. When the subscription information is identified, the 5GC may additionally store associated content in e.g., a UDM.

In operation 1, the 5GC may determine whether the GNSS is available. The 5GC may identify information about a position (e.g., position coordinates and a range) where a change in whether the GNSS is available occurs. As it is the case that the identification is made by the 5GC, the position information may be represented based on a cell ID or the like. Whether the GNSS is available may be determined by an extra 5GS sync NF in the 5GC.

In operation 2, the 5GS sync NF may send an AMF a request (i.e., subscription) to notify a matching UE based on the position information when the matching UE is found.

In operation 3, the AMF may notify the 5GS sync NF of matching UEs based on the position information. In this case, the notification sent from the AMF may include time sync accuracy and holdover time requested by the UE.

In operation 3a, the 5GS sync NF may compute a sync accuracy level or a time error budget that may satisfy the UE requirements based on the time sync accuracy and holdover time requested by the UE and time sync accuracy provided by the current 5GS. When the 5GS sync NF manages multiple UEs, the 5GS sync NF may determine the sync accuracy level or the time error budget provided by the 5GS based on a maximum holdover time requirement.

In operation 3b, the 5GS sync NF may send a UDM/UDR a request (i.e., subscription) to notify a change in holdover time information of the UE when the change occurs.

In operations 4a, 5a and 6a, when there is a change in sync accuracy level or time error budget provided by the 5GS, the 5GS sync NF may convey the sync accuracy level or time error budget provided by the 5GS to a RAN node through a UDR, a PCF and an AMF. In this case, the RAN node may regulate a system information block (SIB) period (e.g., increase or decrease) based on the sync error budget information sent from the 5GC (or 5GS sync NF). Furthermore, the RAN node may fulfill the holdover time requirement of each UE by regulating a measurement period of a delay time between the BS and the UE used to measure a timing advance value with the UE.

In operations 4, 5 and 6, the 5GS sync NF may send the matching UE based on the position information a message including an indication that the GNSS or the 5GS sync is available. The message may include information about the holdover time. In this case, the holdover time may be managed with a timer through intermediate UDR, PCF, AMF and gNB. For example, when the 5GS sync is used in place of the GNSS for more than holdover time, the intermediate UDR, PCF, AMF and gNB may automatically handle the indication as invalid.

After operation 5, when the UE has been in an idle mode, paging process of the UE is performed and upon identifying the paging process, the UE sends a service request to the RAN node and switches into a connected mode, and then operation 6 may be performed.

When the holdover time information is sent to the UE, the UE may determine whether the holdover time meets a requirement of the UE. When the holdover time is met (greater than the requirement of the UE), the UE may determine that the sync accuracy level provided by the 5GS is higher than the sync accuracy provided by the UE. The UE may set a timer based on the received holdover time information. For example, a maximum time for which the 5GS sync is used in place of the GNSS may be set to the holdover time.

Figure 5:
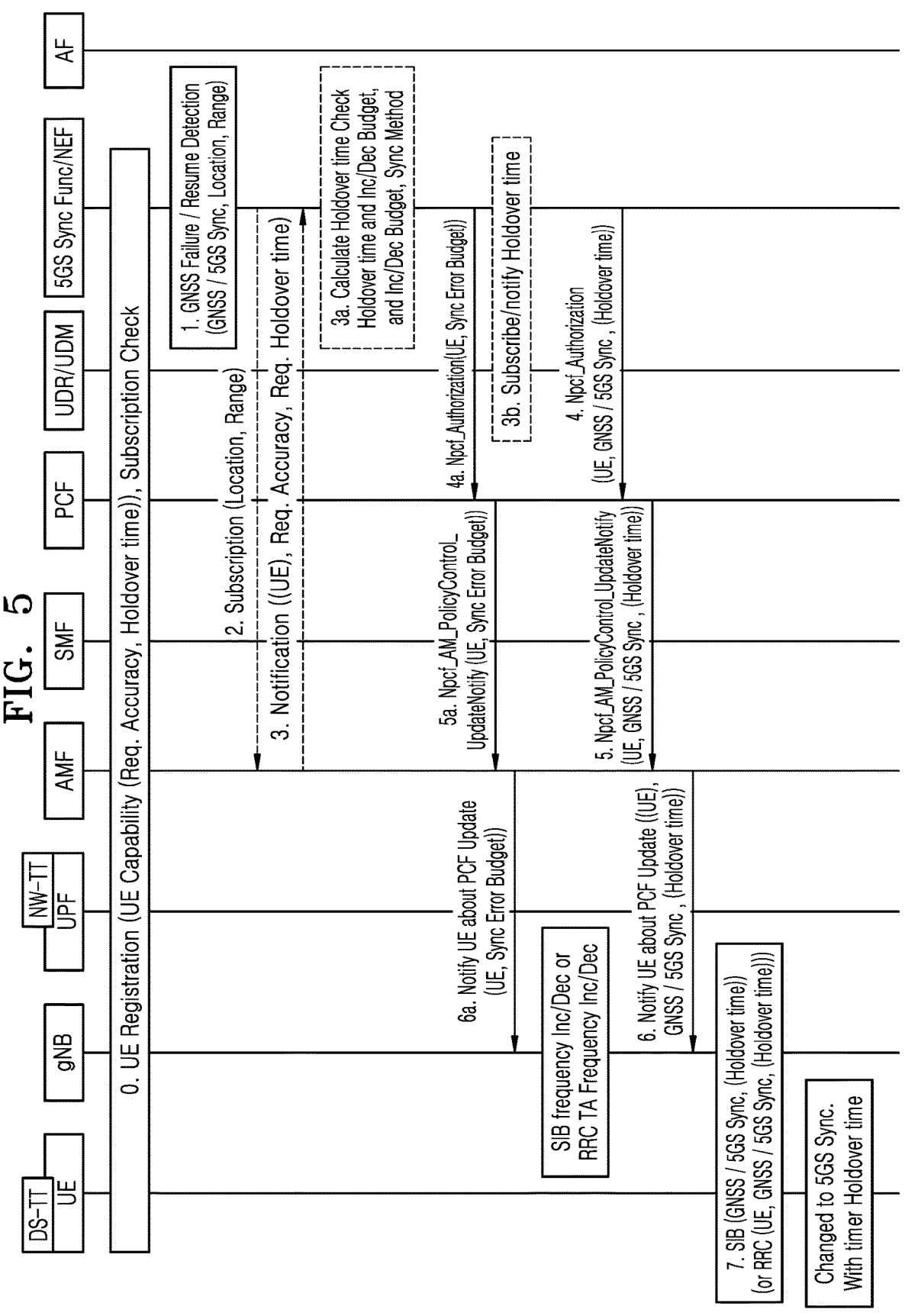
FIG. 5 illustrates an occasion when a 5GC conveys a synchronization indication to a UE via access stratum (AS) according to an embodiment of the disclosure.

FIG. 5 illustrates an occasion when a 5GC conveys a synchronization indication to a UE via access stratum (AS) according to an embodiment of the disclosure.

Referring to FIG. 5, in operation 0, the UE may send requirements for time sync accuracy and holdover time to the 5GC through a process of registering for the 5GS. On receiving the requirements, the 5GC may determine subscription information including e.g., whether the UE is able to receive 5GS sync. When the subscription information is identified, the 5GC may additionally store the content in e.g., a UDM.

In operation 1, the 5GC may determine whether the GNSS is available. The 5GC may identify information about a position (e.g., position coordinates and a range) where a change in whether the GNSS is available occurs. As it is the case that the identification is made by the 5GC, the position information may be represented based on a cell ID or the like. Whether the GNSS is available may be determined by an extra 5GS sync NF in the 5GC.

In operation 2, the 5GS sync NF may send an access and mobility management function (AMF) a request (i.e., subscription) to notify a matching UE based on the position information when the matching UE is found.

In operation 3, the AMF may notify the 5GS sync NF of matching UEs based on the position information. In this case, the notification sent from the AMF may include time sync accuracy and holdover time requested by the UE.

In operation 3a, the 5GS sync NF may compute a sync accuracy level or a time error budget that may satisfy the UE requirements based on the time sync accuracy and holdover time requested by the UE and time sync accuracy provided by the current 5GS. When the 5GS sync NF manages multiple UEs, the 5GS sync NF may determine the sync accuracy level or the time error budget provided by the 5GS based on a maximum holdover time requirement.

In operation 3b, the 5GS sync NF may send a UDM/UDR a request (i.e., subscription) to notify a change in holdover time information of the UE when the change occurs.

In operations 4a, 5a and 6a, when there is a change in sync accuracy level or time error budget provided by the 5GS, the 5GS sync NF may convey the sync accuracy level or time error budget provided by the 5GS to a RAN node through a UDR, a PCF and an AMF. In this case, the RAN node may regulate a SIB period (e.g., increase or decrease) based on the sync error budget information sent from the 5GC (or 5GS sync NF). Furthermore, the RAN node may fulfill the holdover time requirement of each UE by regulating a measurement period of a delay time between the BS and the UE used to measure a timing advance value with the UE.

In operations 4, 5 and 6, the 5GS sync NF may send the matching UE based on the position information a message including an indication that the GNSS or the 5GS sync is available. The message may include information about the holdover time. In this case, the holdover time may be managed with a timer through intermediate UDR, PCF, AMF and gNB. For example, when the 5GS sync is used in place of the GNSS longer than the holdover time, the intermediate UDR, PCF, AMF and gNB may automatically handle the indication as invalid.

In operation 7, the gNB may add the holdover time or the indication that the 5GS sync is available in a SIB and radio resource control (RRC). With this, the UE may receive the indication that the GNSS or the 5GS sync is available and also receive information about the holdover time.

When the holdover time is sent to the UE, the UE may determine whether the holdover time meets a requirement of the UE. When the holdover time is met (greater than the requirement of the UE), the UE may determine that the sync accuracy level provided by the 5GS is higher than the sync accuracy provided by the UE. The UE may set a timer based on the received holdover time information. For example, a maximum time for which the 5GS sync is used in place of the GNSS may be set to the holdover time.

Figure 6:
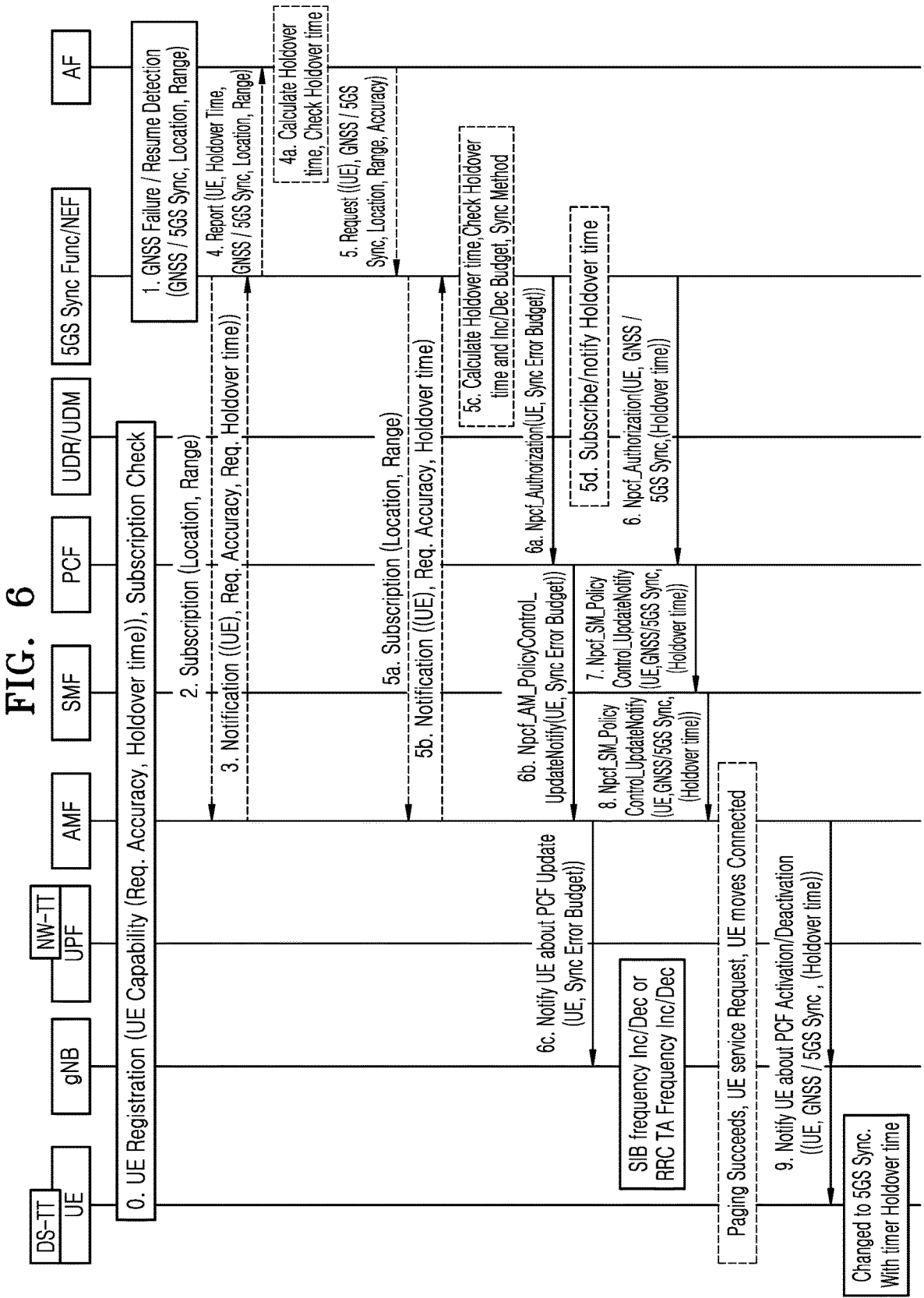
FIG. 6 illustrates an occasion when a 5GC gives a notification to an application function (AF) and the AF conveys a synchronization indication to a UE via SM NAS according to an embodiment of the disclosure.

FIG. 6 illustrates an occasion when a 5GC gives a notification to an AF and the AF conveys a synchronization indication to a UE via SM NAS according to an embodiment of the disclosure.

Referring to FIG. 6, in operation 0, the UE may send requirements for time sync accuracy and holdover time to the 5GC through a process of registering for the 5GS. On receiving the requirements, the 5GC may determine subscription information including e.g., whether the UE is able to receive 5GS sync. When the subscription information is identified, the 5GC may additionally store the content in e.g., a UDM.

In operation 1, an AF may determine whether the GNSS is available. Through a network exposure function (NEF), the AF may identify information about a position (e.g., position coordinates and a range) where a change in whether the GNSS is available occurs. In an embodiment of the disclosure, the NEF may identify the information about a position where a change in whether the GNSS is available occurs by converting the position information directly received from the AF to position information on an intra-5GS basis. In an embodiment of the disclosure, an extra 5GS sync NF that is in charge of the position information may identify the information about a position where a change in whether the GNSS is available occurs by converting the position information directly received from the AF to position information on an intra-5GS basis. In this case, the NEF may forward the position information received from the AF to the 5GS sync NF. The position information on the intra-5GS basis may be represented based on a cell ID or the like.

In operation 2, the 5GS sync NF may send an AMF a request (i.e., subscription) to notify a matching UE based on the position information when the matching UE is found.

In operation 3, the AMF may notify the 5GS sync NF of matching UEs based on the position information. In this case, the notification sent from the AMF may include time sync accuracy and holdover time requested by the UE.

In operation 4, the 5GS sync NF/NEF may report the matching UEs based on the position information notified from the AMF to the AF. In this case, the report sent from the 5GS sync NF/NEF may include a requirement for holdover time.

In operation 4a, the AF may determine whether the requirement for holdover time may be supported, based on a result of comparison with sync accuracy requested by the AF from the 5GS. When required, in operation 5, the 5GS receives a request for sync with increased sync accuracy.

In operation 5, the AF may send the 5GS a request to give the UE a GNSS/5GS sync indication. When the AF sends the 5GS the request to give the UE the GNSS/5GS sync indication, the AF may specify a UE to receive the GNSS/5GS sync indication by adding the position information to the request.

In operation 5a, the 5GS sync NF/NEF may send an AMF a request (i.e., subscription) to notify a matching UE based on the position information when the matching UE is found. The position information may be represented based on a cell ID or the like.

In operation 5b, the AMF may notify the 5GS sync NF/NEF of matching UEs based on the position information. In this case, the notification sent from the AMF may include time sync accuracy and holdover time requested by the UE.

In operation 5c, the 5GS sync NF/NEF may compute a sync accuracy level or a time error budget that may satisfy the UE requirements based on the time sync accuracy and holdover time requested by the UE and time sync accuracy provided by the current 5GS. When the 5GS sync NF/NEF manages multiple UEs, the 5GS sync NF/NEF may determine the sync accuracy level or the time error budget provided by the 5GS based on a maximum holdover time requirement.

In operation 5d, the 5GS sync NF/NEF may send a UDM/UDR a request (i.e., subscription) to notify a change in holdover time information of the UE when the change occurs.

In operations 6a, 6b and 6c, when there is a change in sync accuracy level or time error budget provided by the 5GS, the 5GS sync NF/NEF may convey the sync accuracy level or time error budget provided by the 5GS to a RAN node through a UDR, a PCF and an AMF. In this case, the RAN node may regulate a system information block (SIB) period (e.g., increase or decrease) based on the sync error budget information sent from the 5GC. Furthermore, the RAN node may fulfill the holdover time requirement of each UE by regulating a measurement period of a delay time between the BS and the UE used to measure a timing advance value with the UE.

In operations 6, 7, 8 and 9, the 5GS sync NF/NEF may send the matching UE based on the position information a message including an indication that the GNSS or the 5GS sync is available. The message may include information about the holdover time. In this case, the holdover time may be managed with a timer by intermediate PCF, SMF, AMF, and gNB. For example, when the 5GS sync is used in place of the GNSS for more than holdover time, the intermediate PCF, SMF, AMF, and gNB may automatically handle the indication as invalid. In an embodiment of the disclosure, this procedure may be proceeded simultaneously with the 5GS being a sync source to convey a port management information container for utilizing a sync message of e.g., IEEE 802.1AS and IEEE 1588.

When the holdover time information is sent to the UE, the UE may determine whether the holdover time meets a requirement of the UE. When the holdover time is met (greater than the requirement of the UE) the UE may determine that the sync accuracy level provided by the 5GS is higher than the sync accuracy provided by the UE. The UE may set a timer based on the received holdover time information. For example, a maximum time for which the 5GS sync is used in place of the GNSS may be set to the holdover time.

After operation 8, when the UE has been in an idle mode, a paging process of the UE is performed and upon identifying the paging process, the UE sends a service request to the RAN node and switches into a connected mode, and then operation 9 may be performed.

Figure 7:
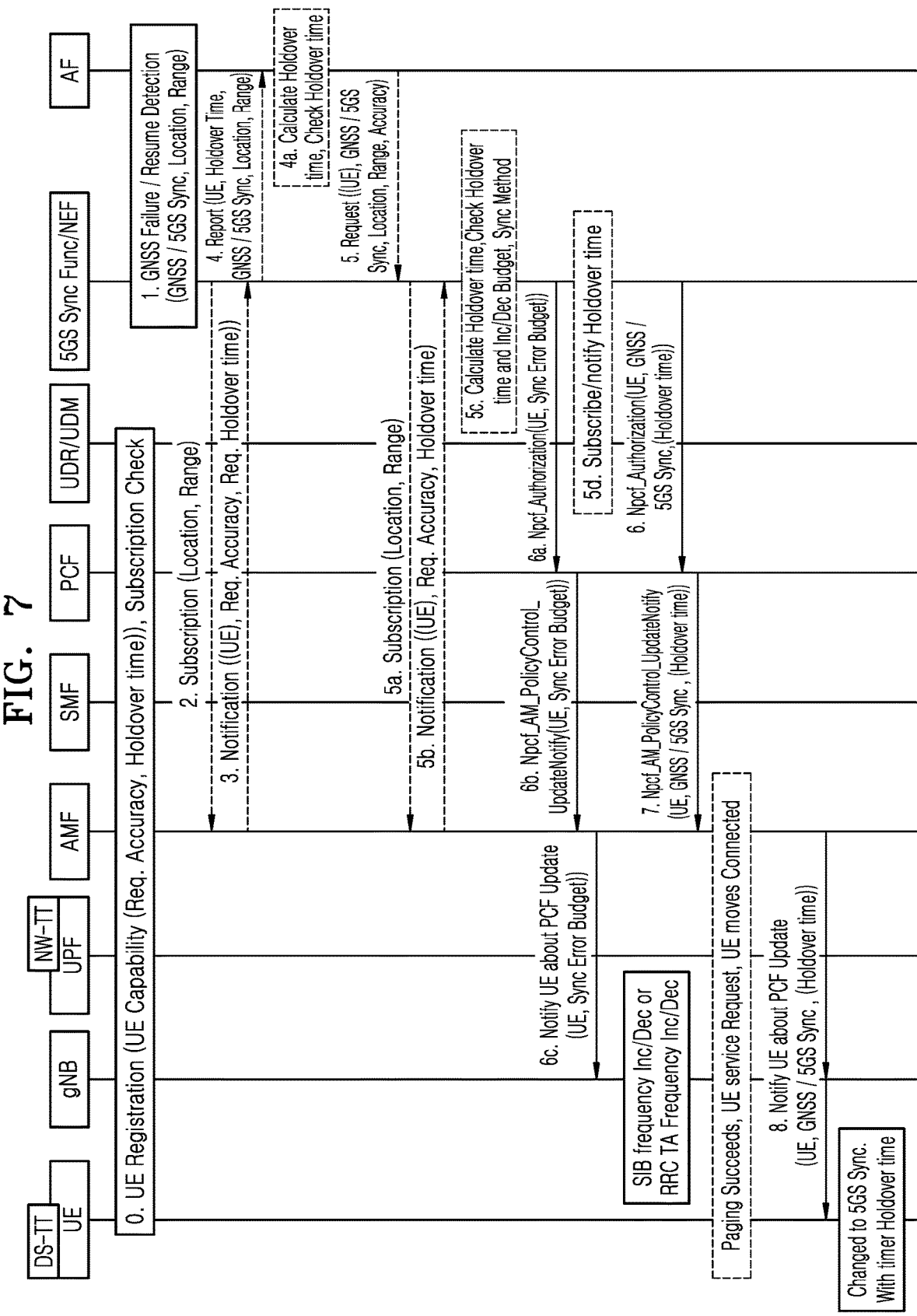
FIG. 7 illustrates an occasion when a 5GC gives a notification to an AF and the AF conveys a synchronization indication to a UE via AM NAS according to an embodiment of the disclosure.

FIG. 7 illustrates an occasion when a 5GC gives a notification to an AF and the AF conveys a synchronization indication to a UE via AM NAS according to an embodiment of the disclosure.

Referring to FIG. 7, in operation 0, the UE may send requirements for time sync accuracy and holdover time to the 5GC through a process of registering for the 5GS. On receiving the requirements, the 5GC may determine subscription information including e.g., whether the UE is able to receive 5GS sync. When the subscription information is identified, the 5GC may additionally store the content in e.g., a UDM.

In operation 1, an AF may determine whether the GNSS is available. Through a NEF, the AF may identify information about a position (e.g., position coordinates and a range) where a change in whether the GNSS is available occurs. In an embodiment of the disclosure, the NEF may identify the information about a position where a change in whether the GNSS is available occurs by converting the position information directly received from the AF to position information on an intra-5GS basis. In an embodiment of the disclosure, an extra 5GS sync NF that is in charge of the position information may identify the information about a position where a change in whether the GNSS is available occurs by converting the position information directly received from the AF to position information on an intra-5GS basis. In this case, the NEF may forward the position information received from the AF to the 5GS sync NF. The position information on the intra-5GS basis may be represented based on a cell ID or the like.

In operation 2, the 5GS sync NF may send an AMF a request (i.e., subscription) to notify a matching UE based on the position information when the matching UE is found.

In operation 3, the AMF may notify the 5GS sync NF of matching UEs based on the position information. In this case, the notification sent from the AMF may include time sync accuracy and holdover time requested by the UE.

In operation 4, the 5GS sync NF/NEF may report the matching UEs based on the position information notified from the AMF to the AF. In this case, the report sent from the 5GS sync NF/NEF may include a requirement for holdover time.

In operation 4*a*, the AF may determine whether the requirement for holdover time may be supported in comparison with sync accuracy requested by the AF from the 5GS. When required, in operation 5, the 5GS receives a request for sync with increased sync accuracy.

In operation 5, the AF may send the 5GS a request to give the UE a GNSS/5GS sync indication. When the AF sends the 5GS the request to give the UE the GNSS/5GS sync indication, the AF may specify a UE to receive the GNSS/5GS sync indication by adding the position information to the request.

In operation 5*a*, the 5GS sync NF/NEF may send an AMF a request (i.e., subscription) to notify a matching UE based on the position information when the matching UE is found. The position information may be represented based on a cell ID or the like.

In operation 5*b*, the AMF may notify the 5GS sync NF/NEF of matching UEs based on the position information. In this case, the notification sent from the AMF may include time sync accuracy and holdover time requested by the UE.

In operation 5*c*, the 5GS sync NF/NEF may compute a sync accuracy level or a time error budget that may satisfy the UE requirements based on the time sync accuracy and holdover time requested by the UE and time sync accuracy provided by the current 5GS. When the 5GS sync NF/NEF manages multiple UEs, the 5GS sync NF/NEF may determine the sync accuracy level or the time error budget provided by the 5GS based on a maximum holdover time requirement.

In operation 5*d*, the 5GS sync NF/NEF may send a UDM/UDR a request (i.e., subscription) to notify a change in holdover time information of the UE when the change occurs.

In operations 6*a*, 6*b* and 6*c*, when there is a change in sync accuracy level or time error budget provided by the 5GS, the 5GS sync NF/NEF may convey the sync accuracy level or time error budget provided by the 5GS to a RAN node through a UDR, a PCF and an AMF. In this case, the RAN node may regulate a system information block (SIB) period (e.g., increase or decrease) based on the sync error budget information sent from the 5GC. Furthermore, the RAN node may fulfill the holdover time requirement of each UE by regulating a measurement period of a delay time between the BS and the UE used to measure a timing advance value with the UE.

In operations 6, 7 and 8, the 5GS sync NF/NEF may send the matching UE based on the position information a message including an indication that the GNSS or the 5GS sync is available. The message may include information about the holdover time. In this case, the holdover time may be managed with a timer by intermediate UDR, PCF, AMF, and gNB. For example, when the 5GS sync is used in place of the GNSS for more than holdover time, the intermediate UDR, PCF, AMF, and gNB may automatically handle the indication as invalid.

When the holdover time information is sent to the UE, the UE may determine whether the holdover time meets a requirement of the UE. When the holdover time is met (greater than the requirement of the UE) the UE may determine that the sync accuracy level provided by the 5GS is higher than the sync accuracy provided by the UE. The UE may set a timer based on the received holdover time information. For example, a maximum time for which the 5GS sync is used in place of the GNSS may be set to the holdover time.

After operation 7, when the UE has been in an idle mode, a paging process of the UE is performed and upon identifying the paging process, the UE sends a service request to the RAN node and switches into a connected mode, and then operation 8 may be performed.

Figure 8:
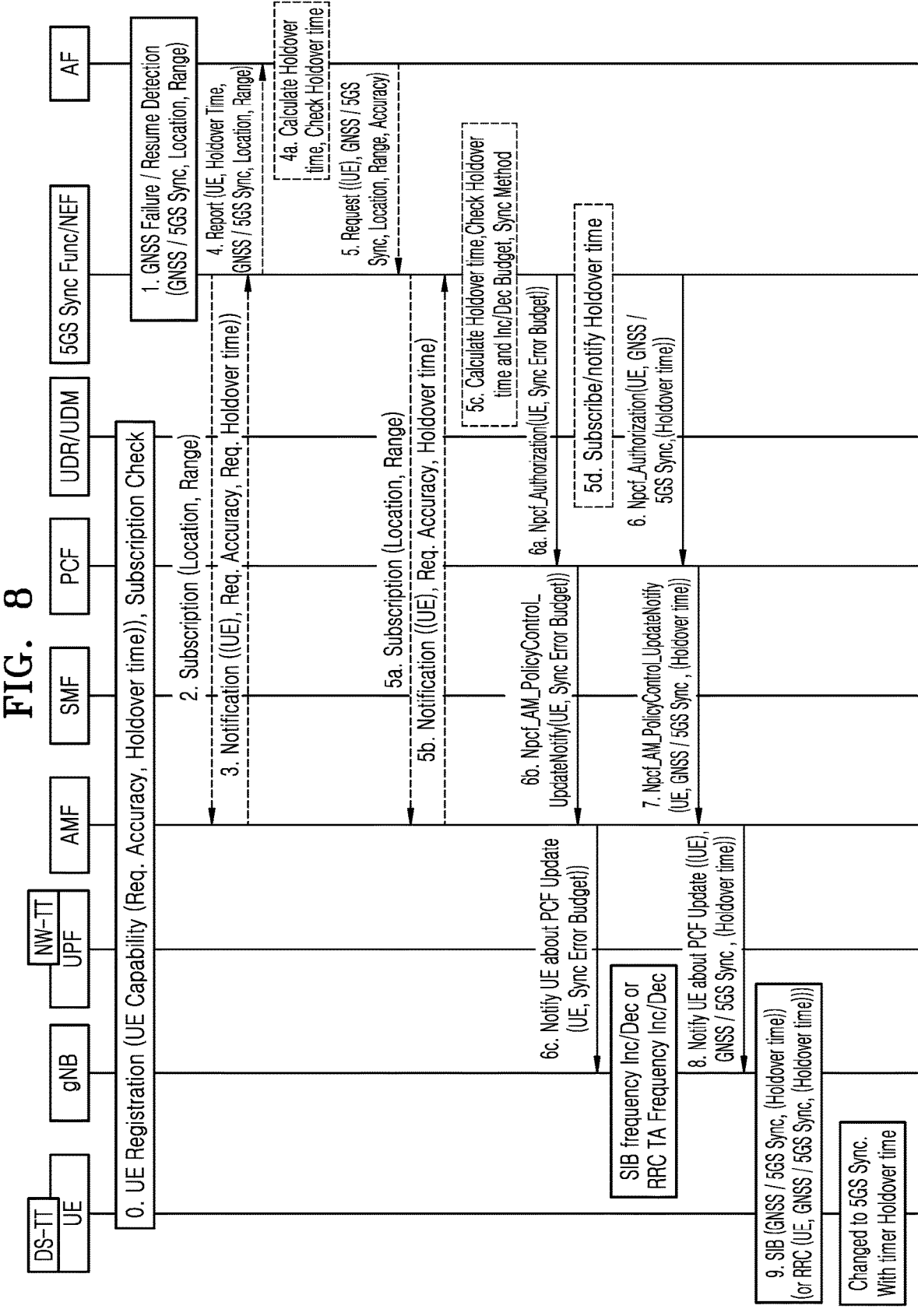
FIG. 8 illustrates an occasion when a 5GC gives a notification to an AF and the AF conveys a synchronization indication to a UE via AS according to an embodiment of the disclosure.

FIG. 8 illustrates an occasion when a 5GC gives a notification to an AF and the AF conveys a synchronization indication to a UE via AS according to an embodiment of the disclosure.

Referring to FIG. 8, in operation 0, the UE may send the 5GC requirements for time sync accuracy and holdover time through a process of registering for the 5GS. On receiving the requirements, the 5GC may determine subscription information including e.g., whether the UE is able to receive 5GS sync. When the subscription information is identified, the 5GC may additionally store the content in e.g., a UDM.

In operation 1, an AF may determine whether the GNSS is available. Through a NEF, the AF may identify information about a position (e.g., position coordinates and a range) where a change in whether the GNSS is available occurs. In an embodiment of the disclosure, the NEF may identify the information about a position where a change in whether the GNSS is available occurs by converting the position information directly received from the AF to position information on an intra-5GS basis. In an embodiment of the disclosure, an extra 5GS sync NF that is in charge of the position information may identify the information about a position where a change in whether the GNSS is available occurs by converting the position information directly received from the AF to position information on an intra-5GS basis. In this case, the NEF may forward the position information received from the AF to the 5GS sync NF. The position information on the intra-5GS basis may be represented based on a cell ID or the like.

In operation 2, the 5GS sync NF may send an AMF a request (i.e., subscription) to notify a matching UE based on the position information when the matching UE is found.

In operation 3, the AMF may notify the 5GS sync NF of matching UEs based on the position information. In this case, the notification sent from the AMF may include time sync accuracy and holdover time requested by the UE.

In operation 4, the 5GS sync NF/NEF may report the matching UEs based on the position information notified from the AMF to the AF. In this case, the report sent from the 5GS sync NF/NEF may include a requirement for holdover time.

In operation 4*a*, the AF may determine whether the requirement for holdover time may be supported in comparison with sync accuracy requested by the AF from the 5GS. When required, in operation 5, the 5GS receives a request for sync with increased sync accuracy.

In operation 5, the AF may send the 5GS a request to give the UE a GNSS/5GS sync indication. When the AF sends the 5GS the request to give the UE the GNSS/5GS sync indication, the AF may specify a UE to receive the GNSS/5GS sync indication by adding the position information to the request.

In operation 5*a*, the 5GS sync NF/NEF may send an AMF a request (i.e., subscription) to notify a matching UE based on the position information when the matching UE is found. The position information may be represented based on a cell ID or the like.

In operation 5b, the AMF may notify the 5GS sync NF/NEF of matching UEs based on the position information. In this case, the notification sent from the AMF may include time sync accuracy and holdover time requested by the UE.

In operation 5c, the 5GS sync NF/NEF may compute a sync accuracy level or a time error budget that may satisfy the UE requirements based on the time sync accuracy and holdover time requested by the UE and time sync accuracy provided by the current 5GS. When the 5GS sync NF/NEF manages multiple UEs, the 5GS sync NF/NEF may determine the sync accuracy level or the time error budget provided by the 5GS based on a maximum holdover time requirement.

In operation 5d, the 5GS sync NF/NEF may send a UDM/UDR a request (i.e., subscription) to notify a change in holdover time information of the UE when the change occurs.

In operations 6a, 6b and 6c, when there is a change in sync accuracy level or time error budget provided by the 5GS, the 5GS sync NF/NEF may convey the sync accuracy level or time error budget provided by the 5GS to a RAN node through a UDR, a PCF and an AMF. In this case, the RAN node may regulate a system information block (SIB) period (e.g., increase or decrease) based on the sync error budget information sent from the 5GC. Furthermore, the RAN node may fulfill the holdover time requirement of each UE by regulating a measurement period of a delay time between the BS and the UE used to measure a timing advance value with the UE.

In operations 6, 7 and 8, the 5GS sync NF/NEF may send the matching UE based on the position information a message including an indication that the GNSS or the 5GS sync is available. The message may include information about the holdover time. In this case, the holdover time may be managed with a timer by intermediate PCF, SMF, AMF, and gNB. For example, when the 5GS sync is used in place of the GNSS for more than holdover time, the intermediate PCF, SMF, AMF, and gNB may automatically handle the indication as invalid.

In operation 9, the gNB may add the holdover time or the indication that the 5GS sync is available in a SIB and RRC. With the holdover time or the indication, the UE may use the GNSS or the 5GS sync.

When the holdover time information is sent to the UE, the UE may determine whether the holdover time meets a requirement of the UE. When the holdover time is met (greater than the requirement of the UE) the UE may determine that the sync accuracy level provided by the 5GS is higher than the sync accuracy provided by the UE. The UE may set a timer based on the received holdover time information. For example, a maximum time for which the 5GS sync is used in place of the GNSS may be set to the holdover time.

Figure 9:
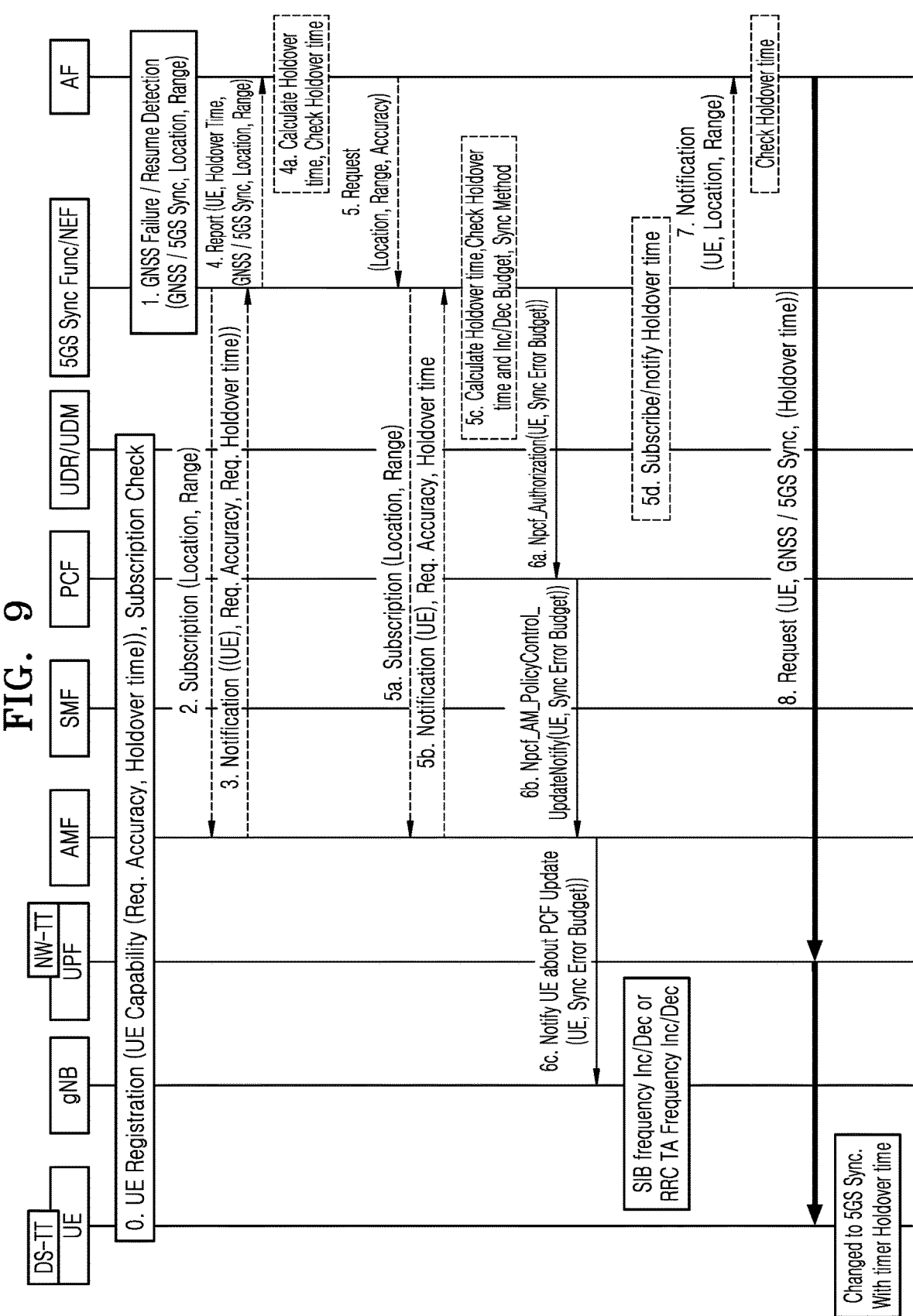
FIG. 9 illustrates an occasion when a 5GC gives a notification to an AF and the AF conveys a synchronization indication to a UE via a user plane according to an embodiment of the disclosure.

FIG. 9 illustrates an occasion when a 5GC gives a notification to an AF and the AF conveys a synchronization indication to a UE via a user plane according to an embodiment of the disclosure.

Referring to FIG. 9, in operation 0, the UE may send the 5GC requirements for time sync accuracy and holdover time through a process of registering for the 5GS. On receiving the requirements, the 5GC may determine subscription information including e.g., whether the UE is able to receive 5GS sync. When the subscription information is identified, the 5GC may additionally store the content in e.g., a UDM.

In operation 1, an AF may determine whether the GNSS is available. Through a NEF, the AF may identify information about a position (e.g., position coordinates and a range) where a change in whether the GNSS is available occurs. In an embodiment of the disclosure, the NEF may identify the information about a position where a change in whether the GNSS is available occurs by converting the position information directly received from the AF to position information on an intra-5GS basis. In an embodiment of the disclosure, an extra 5GS sync NF that is in charge of the position information may identify the information about a position where a change in whether the GNSS is available occurs by converting the position information directly received from the AF to position information on an intra-5GS basis. In this case, the AF may forward the position information received from the AF to the 5GS sync NF. The position information on the intra-5GS basis may be represented based on a cell ID or the like.

In operation 2, the 5GS sync NF may send an AMF a request (i.e., subscription) to notify a matching UE based on the position information when the matching UE is found.

In operation 3, the AMF may notify the 5GS sync NF of matching UEs based on the position information. In this case, the notification sent from the AMF may include time sync accuracy and holdover time requested by the UE.

In operation 4, the 5GS sync NF/NEF may report the matching UEs based on the position information notified from the AMF to the AF. In this case, the report sent from the 5GS sync NF/NEF may include a requirement for holdover time.

In operation 4a, the AF may determine whether the requirement for holdover time may be supported in comparison with sync accuracy requested by the AF from the 5GS. When required, in operation 5, the 5GS receives a request for sync with increased sync accuracy.

In operation 5, the AF may send the 5GS a request to give the UE a GNSS/5GS sync indication. When the AF sends the 5GS the request to give the UE the GNSS/5GS sync indication, the AF may specify a UE to receive the GNSS/5GS sync indication by adding the position information to the request.

In operation 5a, the 5GS sync NF/NEF may send an AMF a request (i.e., subscription) to notify a matching UE based on the position information when the matching UE is found. The position information may be represented based on a cell ID or the like.

In operation 5b, the AMF may notify the 5GS sync NF/NEF of matching UEs based on the position information. In this case, the notification sent from the AMF may include time sync accuracy and holdover time requested by the UE.

In operation 5c, the 5GS sync NF/NEF may compute a sync accuracy level or a time error budget that may satisfy the UE requirements based on the time sync accuracy and holdover time requested by the UE and time sync accuracy provided by the current 5GS. When the 5GS sync NF/NEF manages multiple UEs, the 5GS sync NF/NEF may determine the sync accuracy level or the time error budget provided by the 5GS based on a maximum holdover time requirement.

In operation 5d, the 5GS sync NF/NEF may send a UDM/UDR a request (i.e., subscription) to notify a change in holdover time information of the UE when the change occurs.

In operations 6a, 6b and 6c, when there is a change in sync accuracy level or time error budget provided by the 5GS, the 5GS sync NF/NEF may convey the sync accuracy level or time error budget provided by the 5GS to a RAN node through a UDR, a PCF and an AMF. In this case, the RAN node may regulate a system information block (SIB) period (e.g., increase or decrease) based on the sync error budget information sent from the 5GC. Furthermore, the RAN node may fulfill the holdover time requirement of each UE by regulating a measurement period of a delay time between the BS and the UE used to measure a timing advance value with the UE.

In operation 7, the 5GS sync NF/NEF may report the matching UEs based on the position information notified from the AMF to the AF. In an embodiment of the disclosure, the report sent from the 5GS sync NF/NEF may include a requirement for holdover time. In this case, the 5GS sync NF/NEF may send a holdover time changed based on the accuracy of the 5GS updated in operations 6a, 6b and 6c in the report.

The AF may determine whether the requirement for holdover time may be supported in comparison with sync accuracy requested by the AF from the 5GS. As the holdover time is updated in operations 5, 6a, 6b and 6c, the AF may determine that the holdover time requirement is supportable in comparison with the sync accuracy requested by the AF from the 5GS. In an embodiment of the disclosure, when the holdover time requirement is not supportable in comparison with the sync accuracy requested by the AF from the 5GS even after the holdover time is updated in operations 5, 6a, 6b and 6c, the AF may update the holdover time.

In operation 8, the AF may send the UE a message including an indication that the GNSS or the 5GS sync is available. The message may include information about the holdover time.

When the holdover time information is sent to the UE, the UE may determine whether the holdover time meets a requirement of the UE. When the holdover time is met (greater than the requirement of the UE) the UE may determine that the sync accuracy level provided by the 5GS is higher than the sync accuracy provided by the UE. The UE may set a timer based on the received holdover time information. For example, a maximum time for which the 5GS sync is used in place of the GNSS may be set to the holdover time.

Figure 10:
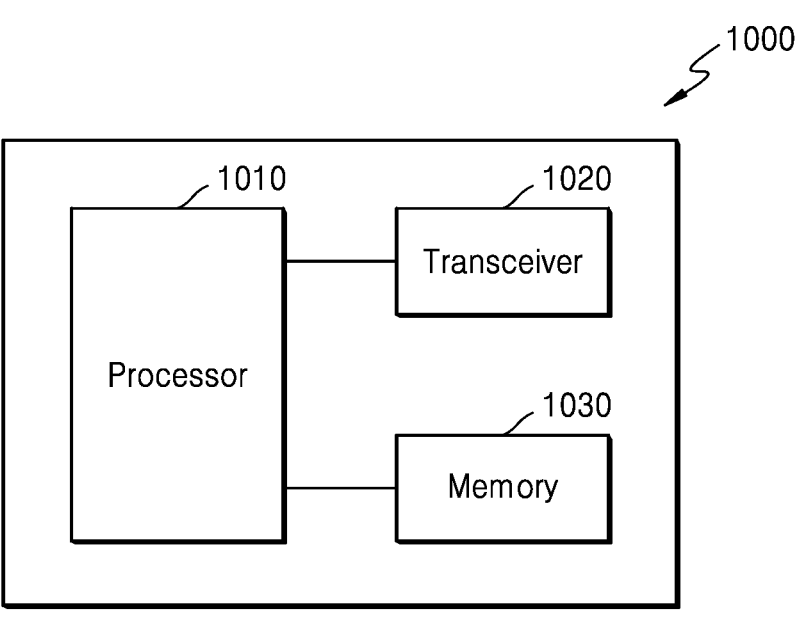
FIG. 10 illustrates a UE according to an embodiment of the disclosure.

FIG. 10 illustrates a UE according to an embodiment of the disclosure.

Referring to FIG. 10, a UE 1000 may include a processor 1010, a transceiver 1020 and a memory 1030. However, not all the components shown in FIG. 10 is required, and the UE 1000 may be implemented with more or less components than those shown in FIG. 10. The processor 1010, the transceiver 1020 and the memory 1030 may be implemented in a single chip in some cases.

The processor 1010 may include one or more processors or other processing devices that control functions, processes, and/or methods proposed in the disclosure. Operation of the UE 1000 may be implemented by the processor 1010.

The transceiver 1020 may include a radio frequency (RF) transmitter for up-converting and amplifying a transmitted signal, and a RF receiver for down-converting the frequency of a received signal. In an embodiment of the disclosure, the transceiver 1020 may be implemented with more or less components than described above.

The transceiver 1020 may be connected to the processor 1010 for transmitting and/or receiving a signal. The signal may include control information and data. In addition, the transceiver 1020 may receive a signal through a wireless channel and output the signal to the processor 1010. The transceiver 1020 may transmit a signal output from the processor 1010 through a wireless channel.

The memory 1030 may store the control information or the data included in the signal obtained by the UE 1000. The memory 1030 may be connected to the processor 1010 and may store at least one instruction, a protocol or a parameter for the proposed function, process, and/or method. The memory 1030 may include a read-only memory (ROM), a random access memory (RAM), a hard disk, a compact disc ROM (CD-ROM), a digital versatile disc (DVD) and/or other storage devices.

Figure 11:
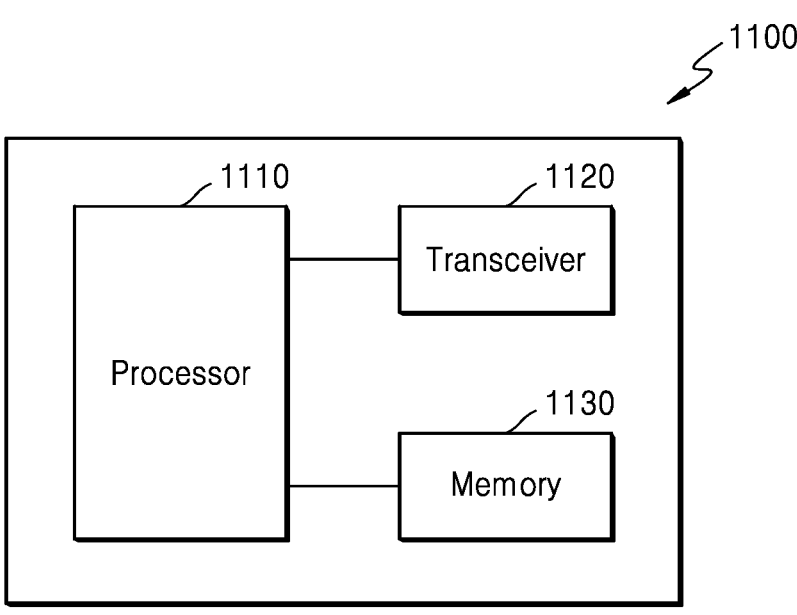
FIG. 11 illustrates a network entity according to an embodiment of the disclosure.

FIG. 11 illustrates a network entity according to an embodiment of the disclosure.

Referring to FIG. 11, a network entity 1100 may include a processor 1110, a transceiver 1120, and a memory 1130. However, not all the components shown in FIG. 10 is required, and the network entity 1100 may be implemented with more or less components than those shown in FIG. 11. The processor 1110, the transceiver 1120 and the memory 1130 may be implemented in a single chip in some cases.

The processor 1110 may include one or more processors or other processing devices that control functions, processes, and/or methods proposed in the disclosure. Operation of the network entity 1100 may be implemented by the processor 1110.

The transceiver 1120 may include an RF transmitter for up-converting and amplifying a transmitted signal, and a RF receiver for down-converting the frequency of a received signal. In an embodiment of the disclosure, the transceiver 1120 may be implemented with more or less components than described above.

The transceiver 1120 may be connected to the processor 1110 for transmitting and/or receiving a signal. The signal may include control information and data. In addition, the transceiver 1120 may receive a signal through a wireless channel and output the signal to the processor 1110. The transceiver 1120 may transmit a signal output from the processor 1110 through a wireless channel.

The memory 1130 may store the control information or the data included in the signal obtained by the network entity 1100. The memory 1130 may be connected to the processor 1110 and may store at least one instruction, a protocol or a parameter for the proposed function, process, and/or method The memory 1130 may include a ROM, a RAM, a hard disk, a CD-ROM, a DVD and/or other storage devices.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus for performing the embodiments of the disclosure through an external port. In addition, a separate storage device in the communication network may be connected to the apparatus for performing the embodiments of the disclosure.

According to an embodiment of the disclosure, based on the indication provided by the 5GS, the UE may determine whether to replace the GNSS by sync provided by the 5GS. Furthermore, embodiments of the disclosure may ensure that the 5GS may replace the GNSS by regulating a sync provision method according to UE requirements for time sync accuracy and holdover time.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an entity in a wireless communication system, the method comprising:
obtaining requirement information for time synchronization from multiple terminals, the requirement information including synchronization error budget;
identifying location information for 5G system synchronization based on a subscription data stored in a unified data management (UDM), wherein the location information comprises information whether the 5G system synchronization is available;
determining synchronization accuracy based on requirement of at least one terminal matching the location information among the multiple terminals; and
transmitting timing information for the time synchronization to the at least one terminal comprising the determined synchronization accuracy.

2. The method of claim 1, wherein the requirement information further comprises information related to a time synchronization coverage area.

3. The method of claim 1, further comprising:
identifying whether an existing synchronization service is available based on at least one of information of the existing synchronization service received from a distributed base station or an external application function (AF), or a signal received from the multiple terminals.

4. The method of claim 1, further comprising:
receiving, from an Access and Mobility Management (AMF) entity, information about the multiple terminals requiring provision of a synchronization service based on location information of the multiple terminals.

5. The method of claim 4, further comprising:
correlating the location information with location information related to the multiple terminals; and identifying the at least one terminal based on the correlation.

6. The method of claim 1, wherein the timing information is transmitted via at least one of access and mobility management non-access stratum (AM NAS), session management non-access stratum (SM NAS), or access stratum (AS).

7. The method of claim 1, further comprising:
identifying whether a synchronization service is required based on information obtained from an AF.

8. The method of claim 1, further comprising:
requesting, to another entity, a changed requirement of the multiple terminals; and
receiving, from the other entity, the changed requirement of the multiple terminals.

9. The method of claim 1, further comprising:
receiving modified information comprising information regarding at least one of synchronization accuracy, time error budget, or holdover time; and
determining a period of a system information block (SIB) or a delay time measurement period for measuring a timing advance value with the multiple terminals.

10. The method of claim 1, further comprising:
comparing the requirement of the at least one terminal with a current synchronization accuracy of a synchronization service; and
determining, based on a result of the comparing, whether the synchronization service is available or the synchronization accuracy.

11. An entity for performing communication in a wireless communication system, the entity comprising:
a transceiver; and
at least one processor coupled with the transceiver and configured to:
obtain requirement information for time synchronization from multiple terminals, the requirement information including synchronization error budget,
identify location information for 5G system synchronization based on a subscription data stored in a unified data management (UDM), wherein the location information comprises information whether the 5G system synchronization is available,
determine synchronization accuracy based on requirement of at least one terminal matching the location information among the multiple terminals, and
transmit timing information for the time synchronization to the at least one terminal comprising the determined synchronization accuracy.

12. The entity of claim 11, wherein the requirement information further comprises information related to a time synchronization coverage area.

13. The entity of claim 11, wherein the at least one processor is further configured to identify whether an existing synchronization service is available based on at least one of information of the existing synchronization service received from a distributed base station or an external application function (AF), or a signal received from the multiple terminals.

14. The entity of claim 11, wherein the at least one processor is further configured to receive, from an access and mobility management (AMF) entity, information about the multiple terminals requiring provision of a synchronization service based on location information of the multiple terminals.

15. The entity of claim 14, wherein the at least one processor is further configured to:
correlate the location information with location information related to the multiple terminals; and identify the at least one terminal based on the correlation.

16. The entity of claim 11, wherein the timing information is transmitted via at least one of access and mobility management non-access stratum (AM NAS), session management non-access stratum (SM NAS), or access stratum (AS).

17. The entity of claim 11, wherein the at least one processor is further configured to identify whether a synchronization service is required based on information obtained from an AF.

18. The entity of claim 11, wherein the at least one processor is further configured to:

request, to another entity, a changed requirement of the multiple terminals, and receive, from the other entity, the changed requirement of the multiple terminals.

19. The entity of claim 11, wherein the at least one processor is further configured to:

receive modified information comprising information regarding at least one of synchronization accuracy, time error budget, or holdover time, and determine a period of a system information block (SIB) or a delay time measurement period for measuring a timing advance value with the multiple terminals.

20. The entity of claim 11, wherein the at least one processor is further configured to: compare the requirement of the at least one terminal with a current synchronization accuracy of a synchronization service, and determine, based on a result of the comparing, whether the synchronization service is available or the synchronization accuracy.

* * * * *